Figure 4:
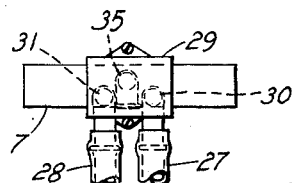

Nov. 26, 1957     L. BRAMLEY     2,814,270
MILKING MACHINE WITH INTERMITTENT MILK FLOW
Filed July 8, 1955     4 Sheets-Sheet 1
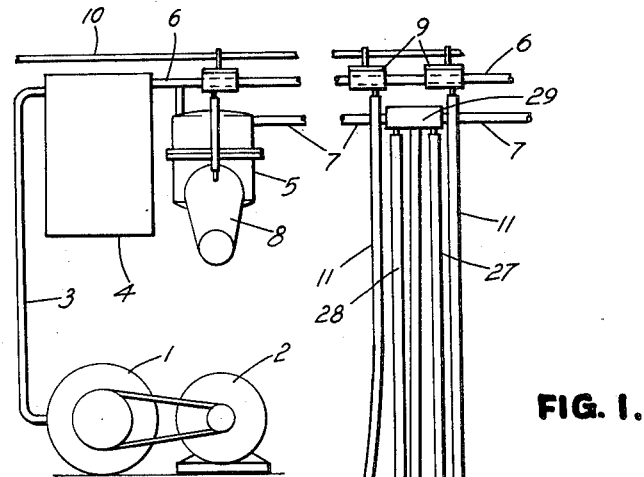
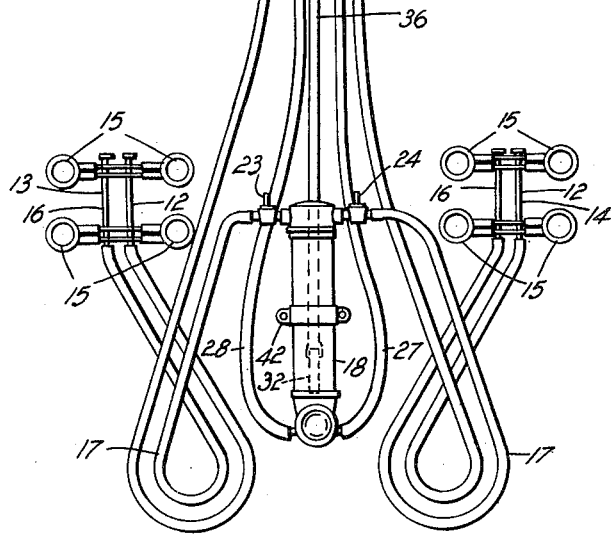
FIG. 1.
Inventor
L. Bramley
By Attys

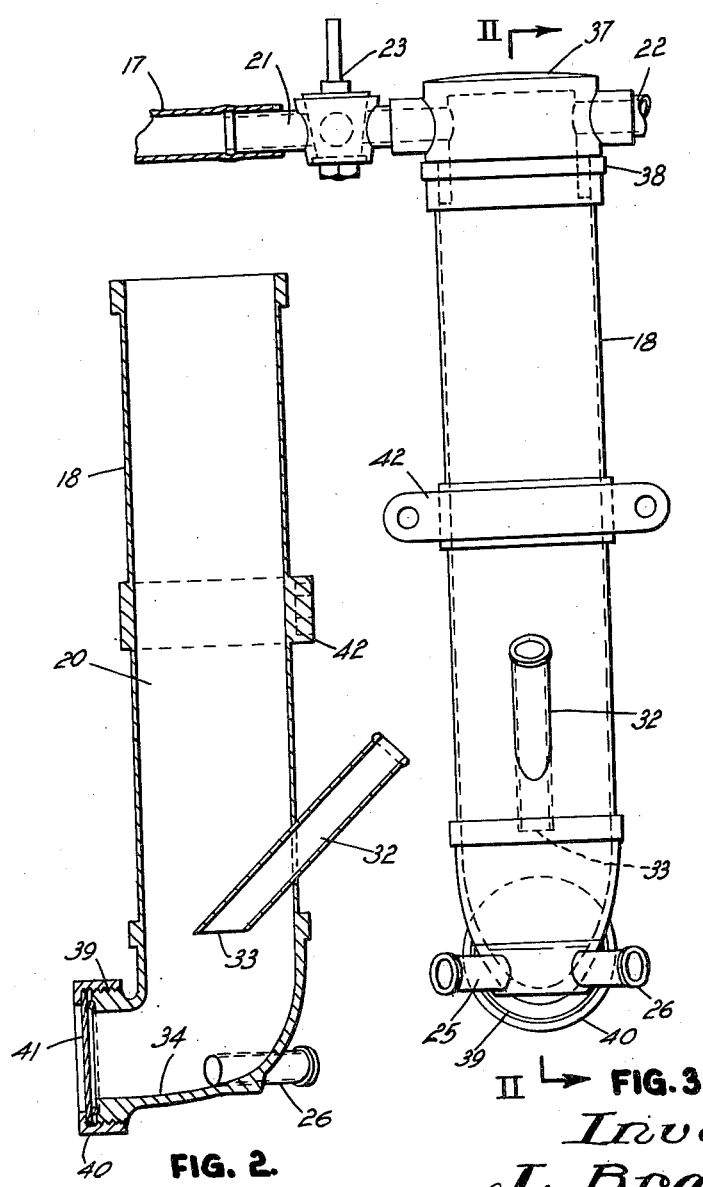

United States Patent Office 2,814,270
Patented Nov. 26, 1957

2,814,270

MILKING MACHINE WITH INTERMITTENT MILK FLOW

Lawrence Bramley, Uruti, Taranaki, New Zealand

Application July 8, 1955, Serial No. 520,856

Claims priority, application New Zealand July 15, 1954

6 Claims. (Cl. 119—14.05)

This invention relates to milking machines.

In modern milking technique it is well known that farmers are reluctant to strip cows by hand because of the time taken and the cost of such time at modern prices for labour. Consequently machine milking only, is at present used on many dairy farms, but the present milking machines have disadvantages in that they do not completely milk a cow as compared with the old fashioned method of machine milking followed by hand stripping.

It is therefore an object of the present invention in one aspect to provide an attachment for use with a milking machine which will obviate or minimize the above disadvantage in a simple yet effective manner.

It is a further object of the present invention to provide an attachment for use with a milking machine which will enable a close simulation of the natural sucking of a calf to be given.

Accordingly, in one aspect, the invention consists in an attachment for use in a milking machine, adapted to be interposed in the milk line, said attachment comprising a chamber having one or more inlets adapted to pass milk into said chamber, and an outlet adapted to be connected to the milk line, and by reason of said outlet to the milk line, being adapted to be subjected to the vacuum in the milk line, said outlet being disposed intermediate of the height of the chamber, the construction and arrangement being such that in use milk will not be withdrawn to any material extent from said chamber until it seals the end of said outlet, whereupon the flow of air through said milk line is substantially interrupted by the transference of milk from the chamber for delivery before the flow of air may recommence.

It is also an object of the present invention to provide a milking machine incorporating an attachment which will obviate or minimize the above disadvantage and which will simulate the natural sucking of a calf.

Accordingly, in a further aspect the invention consists in a milking machine having an attachment interposed in the milk line said attachment comprising a chamber having one or more inlets adapted to pass milk into said chamber and an outlet to the milk line, and by reason of said outlet to the milk line, being adapted to be subjected to the vacuum in the milk line, said outlet being disposed intermediate of the height of the chamber, the construction and arrangement being such that in use milk will not be withdrawn to any material extent from said chamber until it seals the end of said outlet, whereupon the flow of air through said milk line is substantially interrupted by the transference of milk from the chamber for delivery before the flow of air may recommence.

Figure 5:
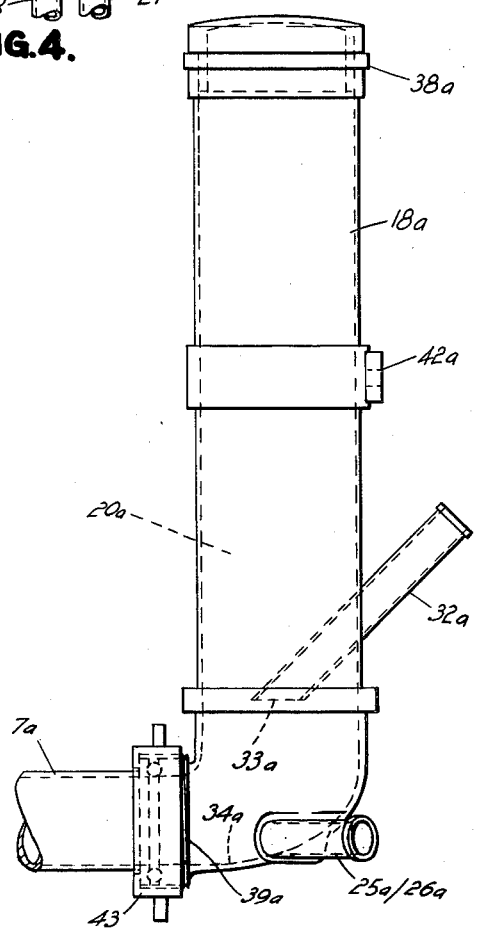
Figure 6:
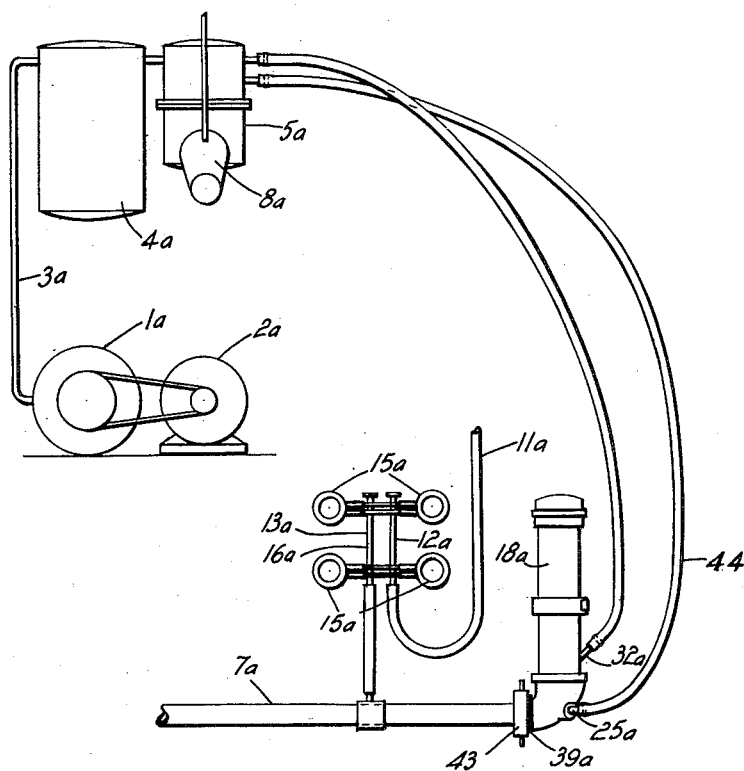

One preferred form of the invention and modifications thereof will now be described with reference to the accompanying drawings in which:

Figure 1 is a diagrammatic drawing of a preferred form of milking machine constructed according to the invention, Figure 2 is a vertical cross section to a larger scale of the attachment showing in Figure 1, on the line II—II, Figure 3, the removable cap being omitted, Figure 3 is a back view on the same scale as Figure 2, of the attachment shown in Figure 1, Figure 4 is an elevation on a larger scale, showing connecting means for connecting a plurality of milk hoses to a milk pipe, Figure 5 is a vertical elevation of a modified form of milking attachment according to the invention, and Figure 6 is a diagrammatic drawing of a milking machine incorporating the latter attachment.

Referring to the drawings, in the preferred form of the invention shown in Figures 1 to 4, a milking machine is provided having a vacuum pump 1 (Figure 1) driven by an electric motor 2 or other suitable means, the vacuum pump 1 being connected by a pipe 3 to a vacuum tank 4 which in turn is connected to a delivery means comprising a releaser 5, and to an air line 6. A milk pipe 7 supplies milk to the releaser 5 the milk being discharged from the chamber 8. The air line 6 and the milk pipe 7 lead to one or more milking positions and a double milking unit shown in Figure 1. From the air line 6 for each double milking unit there are provided two pulsator units, referenced 9, which may be any known type of pulsator unit for example those operated by a mechanically reciprocated rod 10, and to each pulsator unit 9 there is attached an air hose 11. These air hoses each lead to the air tube 12 of respective teat cup claws 13 and 14 to which are attached the associated teat cups 15. The above description is of course that of a well known type of milking machine equipped for what is known as double up milking—i. e. milking in which a set of teat cups are available for each two cows. For the purposes of the description of the present invention, the term "milk line" is intended to include the milk pipes or tubes from the teat cups such as the teat cup 15 to the delivery means such as the releaser 5.

According to the present invention an attachment is interposed in the milk line, and preferably an attachment is provided in each milking unit, positioned as shown in Figure 1. In this figure the milk tubes 16 of the respective teat cup claws 13 and 14 are connected by flexible leads 17 to an attachment 18 interposed in the milk line. The attachment 18 is constructed and connected to the milk line as follows:

The milking attachment comprises a chamber 20 (Figure 2) having in the preferred form five connections thereto. Two of these connections 21 and 22 (Figure 3) comprise inlets to the chamber and are connected to the flexible milk leads 17 through stop cocks 23 and 24. Only one such connection may be provided, e. g. to accommodate one set of teat cups only. Three connections are taken from the chamber 20 to the milk pipe 7. These three connections include two similar connections 25 and 26 which comprise subsidiary outlets. Only one such outlet may be provided e. g. to cater for one set of teat cups only. Connections 25 and 26 enter the chamber 20 at or near the lower end thereof. The connections 25 and 26 are in turn connected to milk hoses 27 and 28 which in turn lead to a milk pipe connection 29 shown in more detail in Figure 4. Referring to Figure 4 it will be seen that the connections 27 and 28 are made to apertures 30 and 31 respectively which are in the lower surface of the milk pipe 7. A further connection 32, Figures 2 and 3, is made to the chamber 20. The inlet orifice 33 of this connection 32 is arranged within the chamber 20 so as to be a short distance above the level of the bottom 34 of the chamber 20. This placing of the orifice 33 has been found to be particularly efficacious although of course some variation in its level is possible while still remaining within the scope of the invention. The connection 32 is connected to the further aperture 35, Figure 4 in the milk pipe 7 by a further milk hose 36. The aperture 35 is placed at a higher level in the milk line than the apertures 30 and 31. The connections 21 and 22 are associated with a removable cap 37 having a rubber or the like sealing washer 38 and at the lower end of the chamber 20 a screw thread 39 is provided to receive a cap 40 which is knurled to allow for its removal. The cap 40 includes a transparent screen 41 to allow the progress of milking to be observed. The removable caps 37 and 40 provide for cleaning. The chamber 20 is adapted to be supported from a suitable support by a bracket 42.

The operation of this form of the invention together with what is thought to be theory of operation will now be given. The electric motor 2 is started, rotating the pump 1 and a vacuum is created throughout the milking machine in the known way. The pulsator rod 10 is operated to cause pulsations to pass down the hoses 11 and the inflations of the teat cups are actuated in the known manner. On the teat cups being applied to a cow's teats milk will begin to flow and I consider that the theory of operation of the chamber 20 is that this milk enters the connections 25 and 26 and moves upwardly within the hoses 27 and 28 but does not reach the level of the milk pipe 7. During this period a steady flow of air will be drawn through the normal air orifice provided in the milk claw tubes 16 and in the present invention this aperture is is enlarged to approximately $\frac{1}{16}''$ in diameter. This procedure will continue until such time as the orifice 33 is sealed by the presence of milk in the bottom of the chamber up to the level of the said orifice 33. When this occurs, because of the presence of the air orifice in the milk claw tube the vacuum in the milk pipe 7 will draw the milk upwardly through all three of the hoses 27, 28 and 36. During this period when milk is being drawn upwardly there will be a material reduction of vacuum applied to the milk tube claw and therefore a reduction in the flow of air through the milk line. This gives a momentary vacuum break action and I believe that this action provides an extremely satisfactory milking action which is very similar to that of a calf drinking when it swallows the milk which it has extracted from the cow. I contend that by the use of my attachment as above described is particularly efficacious. As soon as the milk has been cleared or has been substantially cleared from the hoses 27, 36 and 28 vacuum is restored to the milk claw tube and the action is repeated. I have found that between clearings of milk there is a natural pulsating action which may be seen by using transparent hoses 27 and 28 which show that the milk oscillates upwardly and downwardly in these tubes. During such oscillation it is possible that the back tube 32 will take some milk up but only a small quantity will be taken at each oscillation and the bottom of the chamber 20 fills more or less steadily until the orifice 33 is again sealed as above described.

I have used an attachment as above described and which has the following dimensions: height of chamber 20 about 19 inches, internal diameter $2\frac{3}{8}$ inches, all connections $\frac{1}{2}$ inch internal diameter. The orifice 33 is $2\frac{5}{8}''$ above the bottom 34 of the chamber, and is preferably centrally disposed.

Although the foregoing describes a preferred form of the invention, other constructions within the spirit of the invention are possible. For example where it is desired to use a low milk pipe, i. e. at ground level, the construction shown in Figures 5 and 6 may be used.

In this form of the invention, a low milk pipe 7a is connected by a suitable coupling 43 to a male thread 39a corresponding with the threaded part 39 in Figure 2. The remaining parts shown in Figures 5 and 6 which are similar to the parts shown in Figures 1 to 4, corresponding parts having the same references in the two figures except that the parts in Figure 5 have the suffix "a" added to the references. The capacity of the various connections and of the chamber 20a is of course adjusted to the volume of milk which it is expected that the attachment will have to deal with. The use of this form of the invention will be obvious from the foregoing. Milk will enter the milk pipe 7a from the teat cup claws connected thereto in the known way. Such milk will pass through into the bottom 34a of the chamber 20a and milk will pass upwardly from the connections 25a/26a through suitable tubes 44 towards a delivery means such as a releaser 5a, milk pump or the like means. No material delivery of milk to the delivering means will be made however until such time as the lower entry 33a is sealed by milk in the bottom 34a of the chamber 20a. When this occurs connections 25a, 26a and 32a will all deliver milk to the delivering means causing a momentary reduction in the supply of vacuum to the chamber 20a and consequently the milk pipe 7a giving the desired effect as above described.

I claim:

1. In a milking system, an air line and a milk line, said milk line being under vacuum, a plurality of milking stations, at least one milking claw at each milking station, a flexible hose connecting each claw to said air line, a chamber, a milk lead from each claw to said chamber, at least two outlet connections including flexible hose elements connecting said chamber to said milk line, one of said outlet connections being spaced upwardly from the bottom of said chamber and the other said outlet connections being substantially at the bottom of said chamber.

2. The milking system of claim 1, in which the flexible hose connection from the lower said outlet connection enters said milk line at the bottom of the milk line, and the flexible hose connection from said outlet spaced upwardly from the bottom of said chamber enters said milk line above the bottom thereof.

3. An attachment for use in a milking machine of the type having a milk line subjected to vacuum, said attachment interposed in the milk line and comprising a chamber having at least one inlet adapted to pass milk into said chamber and an outlet connected to the milk line, said chamber being subjected to the vacuum in the milk line, said outlet being disposed intermediate of the height of the chamber, at least one subsidiary outlet a short distance below the level of said outlet, said subsidiary outlet being also connected to said milk line, the construction and arrangement being such that in use milk will not be withdrawn to any material extent from said chamber until it seals the end of said outlet whereupon the flow of air through said milk line is substantially interrupted by the transference of milk from the chamber for delivery before the flow of air may recommence.

4. A milking attachment as claimed in claim 3, wherein said subsidiary outlet and the bottom of the chamber are disposed from 2 to 4, and preferably $2\frac{1}{2}''$, below the level of said outlet disposed intermediate of the length of the chamber.

5. An attachment as claimed in claim 3, wherein said subsidiary outlet is disposed near the bottom of said chamber.

6. An attachment as claimed in claim 3, wherein the chamber extends above said outlet intermediate the length of the chamber by a distance which is approximately five times the distance between said outlet intermediate the length and said subsidiary outlet at the bottom of the chamber.

References Cited in the file of this patent

UNITED STATES PATENTS

| 1,142,626 | Remy | June 8, 1915 |
| 2,371,803 | Cleverly | Mar. 20, 1945 |

FOREIGN PATENTS

| 121,942 | Australia | Aug. 22, 1946 |